3,214,500
PROCESS FOR MAKING FILAMENTARY STRUCTURES PREPARED FROM THE POLYCARBONATE OF 2,2-(4,4'-DIHYDROXYDIPHENYL) PROPANE
Sidney B. Maerov, Kinston, N.C., and Wilfred Sweeny, Wycliffe, Wilmington, Del., assignors to E. I. du Pont de Nemours and Company, Wilmington, Del., a corporation of Delaware
No Drawing. Filed Sept. 30, 1960, Ser. No. 59,490
8 Claims. (Cl. 264—210)

This invention relates to shaped articles from polycarbonates. More particularly it relates to new and improved fibers, filaments, yarns and fabrics prepared from the polycarbonate of 2,2-(4,4'-dihydroxydiphenyl)propane.

A relatively new class of polymeric materials which is becoming increasingly important commercially is the class of high molecular weight aromatic polycarbonates. The polycarbonates are found to be useful because of their high melting point, high second order transition point, low moisture absorption, good heat stability in the presence of air or oxygen, and their toughness and other good mechanical properties.

High molecular weight polycarbonates may be produced by reacting aromatic dihydroxy compounds, particularly dimonohydroxyarylalkanes, as such or in admixture with aliphatic or cycloaliphatic dihydroxy compounds, with aliphatic or aromatic diesters of carbonic acid or with phosgene, or by reacting bischlorocarbonic acid esters of aromatic dihydroxy compounds with free aromatic or aliphatic dihydroxy compounds. Procedures for producing the polycarbonates are described in British Patents 772,627 and 800,815. A general discussion of the preparation and properties of polycarbonates is found in an article by Schnell in Angewandete Chemie, volume 68, pages 633–40 (1956).

Probably the most commercially important example of the aromatic polycarbonates is the polycarbonate of 2,2-(4,4'-dihydroxydiphenyl)propane, currently being sold as a resin under the trademark "Lexan" by the General Electric Company, which has the following structural formula:

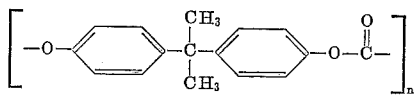

The preparation of fibers and films from this polycarbonate is known, and Belgian Patent 564,009 describes a drawing procedure for orienting fibers and films in order to improve their strength and other physical properties.

In attempting to prepare commercially acceptable textile fabrics for use in wearing apparel, and the like, it has now been found that fibers prepared from the polycarbonate of 2,2-(4,4'-dihydroxydiphenyl)propane according to procedures known in the art, although highly advantageous in other respects, are peculiarly sensitive to contact with organic solvents, e.g., dry cleaning solvents such as the chlorinated hydrocarbons or ketones such as acetone. When exposed to a chlorinated hydrocarbon solvent, as in dry cleaning, filaments and fabrics prepared from this polycarbonate were found not only to shrink excessively but also to coalesce, resulting in a harsh and boardy fabric handle. This extreme solvent sensitivity of fibers from the polycarbonate of 2,2-(4,4'-dihydroxydiphenyl)propane has prevented the commercial exploitation of this polymer in the field of textile fibers. High temperature drawing procedures, with or without subsequent heat treatments to anneal the fibers, have failed to overcome this problem.

Therefore, it is a primary object of this invention to provide yarns and fabrics of the polycarbonate of 2,2-(4,4'-dihydroxydiphenyl)propane which have a decreased sensitivity to dry cleaning solvents. A further object is the provision of oriented crystalline polycarbonate fibers which are resistant to shrinking and coalescing when exposed to tetrachloroethylene or acetone. A further object is the provision of a procedure for preparing fibers from the polycarbonate of 2,2-(4,4'-dihydroxydiphenyl) propane which have a reduced sensitivity to ketones and chlorinated hydrocarbon solvents. Other objects will be apparent as the description of the invention proceeds.

These and other objects are obtained by the provision of fibers, filaments, and the like structures prepared from the polycarbonate of 2,2-(4,4'-dihydroxydiphenyl)propane having an intrinsic viscosity of at least 0.80 which are characterized by an absolute crystallinity of at least 27%, a density of at least 1.220, and an average degree of molecular orientation corresponding to a sonic velocity of at least 1.85 km./sec.

The novel fibers of this invention may be prepared by a process which comprises spinning filaments from the polycarbonate of 2,2-(4,4'-dihydroxydiphenyl)propane having an intrinsic viscosity of at least 0.80, drawing the as-spun filaments at a temperature between 170° C. and 180° C. with a draw ratio of at least 4.0, and thereafter bringing the oriented filaments, under tension, into contact for a period of at least 1 second with a solvent characterized by the fact that it induces crystallization in the oriented filament at a faster rate than it dissolves the polymer.

The term "intrinsic viscosity" is used herein as a measure of the degree of polymerization of the polycarbonate and may be defined as:

$$\text{limit } \frac{\log_e (r)}{c}, \text{ as } c \text{ approaches } 0$$

wherein $r$ is the ratio of the viscosity of a solution of the polycarbonate in a mixture of 10 parts of phenol and 7 parts of 2,4,6-trichlorophenol (by weight) to the viscosity of the phenol-trichlorophenol mixture, per se, measured in the same units at 25° C., and $c$ is the concentration in grams of the polycarbonate per 100 cc. of solution.

Although fibers and films may be prepared from the polycarbonate of 2,2-(4,4'-dihydroxydiphenyl)propane with intrinsic viscosities as low as 0.4 or lower, it has not been found possible to prepare oriented crystalline textile yarns from polycarbonates with such low intrinsic viscosities. In order to prepare the oriented-crystalline fibers of this invention it is essential that the intrinsic viscosity of the polymer be above about 0.80, and for best results above about 0.90. Structures in which the polymer has an intrinsic viscosity above about 0.80 are capable of being drawn with high draw ratios and subsequently crystallized without excessive loss of orientation.

Polycarbonates are known to undergo crystallization, although prior to this invention the degree of crystallization in oriented fibers was relatively minor. It is difficult to measure the absolute crystallinity of linear polycarbonates of aromatic phenols with great precision; however, there are several known methods for estimating the crystallinity of such polycarbonates within a few percent. A new method, described herein, based on the application of X-ray diffraction techniques, gives a very precise determination of relative crystallinity, and when combined with density measurements, is found to give a satisfactory measure of absolute crystallinty.

In the method of determining crystallinity used herein, the first step consists of setting up a relative crystallinity index as follows: reference samples of a completely amorphous polycarbonate fiber and the most crystalline fiber obtainable are prepared and X-ray diffraction patterns of these samples, along with the "unknown" fiber, are made by standard X-ray photographic film techniques using a vacuum camera having means for rotating samples so that orientation effects are eliminated. A radial densitometer scan of the pattern is then made (giving a plot of intensity versus diffraction angle). The resulting three curves are "normalized" by adjusting the height of the curves above the horizontal axis (diffraction angle axis) so that the total area under each curve is the same. Normalization corrects for differences in sample mass and exposure time. This procedure for normalization assumes only that the total scattering is independent of the degree of crystallinity of the sample.

Intensity readings are then determined from the three curves at intervals along the diffraction angle axis, and the differences in intensity for each point "i" on the axis are calculated as $(I_u-I_a)_i$ and $(I_c-I_a)_i$ where $I_u$ is the intensity of the unknown, $I_a$ is the intensity of the amorphous sample and $I_c$ is the intensity of the crystalline sample. The values for $(I_u-I_a)_i$ are then plotted against the values for $(I_c-I_a)_i$ for various values of $i$, giving a straight line with slope A. The value of A approaches 1 for highly crystalline "unknown" samples, whereas for samples of low crystallinity A approaches 0. The crystalline standard is arbitrarily assigned an index value of 100 so the crystallinity index of the unknown sample then becomes $100 \times A$. This procedure has been found to give precise and reproducible values.

The amorphous and crystalline samples used to establish the high and low ends of the crystallinity index scale were chosen as follows. (a) The amorphous sample was chosen by examining the X-ray diffraction diagrams of several filaments drawn with a low draw ratio (and not crystallized) and picking a sample for which the X-ray diffraction diagram showed no trace of crystallinity. The sample was found to have a density of 1.190. (b) The crystalline sample (crystallinity index 100) was prepared by drawing a filament 6.0× at a temperature of 170–175° C., immersing the filament in a restrained condition in a solution of 10 volume parts water and 90 volume parts acetone at room temperature for 15 minutes, drying the sample in air and setting it in the same restrained condition using hot air at 140° C. for two minutes. The sample was then soaked in an unrestrained condition in perchloroethylene at 65° C. for 15 minutes. The sample was found to have a density of 1.242. All samples prepared in this manner gave the same high degree of crystallinity.

The crystallinity index values determined as above may be converted to absolute crystallinity values by reference to density measurements where good density measurements are available and where, as in the present case, the crystalline density is known. A plot of density versus crystallinity index for various fibers prepared from the polycarbonate of 2,2-(4,4'-dihydroxydiphenyl)propane obeyed a best-fit straight line of equation: Density=0.0005 (crystallinity index)+1.190 where 1.190 was the density of amorphous polymer. Substituting the density, 1.30, of 100 percent crystalline polymer [A. Prietzschk, Kolloid Zeit., 156, 8, 1958] in this equation gives 220 as the theoretical crystallinity index for 100% crystalline polymer. The crystallinity index as determined by the previously described X-ray technique may be converted to percent absolute crystallinity by the relation, percent absolute crystallinity=crystallinity index ×100/200.

The oriented crystalline fibers of this invention are characterized by an absolute crystallinity of at least about 27% (crystallinity index of 60). Fibers having an absolute crystallinity of less than about 27% are excessively sensitive to chlorinated hydrocarbon solvents, particularly with respect to dimensional stability and to coalescense of adjacent filaments.

The oriented crystalline fibers of this invention are found to have a density of at least about 1.220. Density measurements are conveniently made by the use of a density gradient tube containing, for example, a mixture of carbon tetrachloride and heptane.

The degree of molecular orientation in both crystalline and amorphous fibers is conveniently identified by measuring the sonic velocity characteristics of the structure according to the method of Church and Moseley, Textile Research Journal, volume 29, page 525 (July 1959). Sonic velocity, in km./sec., is measured by means of apparatus known in the art, passing a sound wave having a frequency of 10,000 cycles per second for a known distance through the polymer structure. The sonic velocity itself may be used as the orientation parameter, or a parameter called fractional molecular orientation may be calculated from the equation $$\alpha = 1 - \frac{C_u^2}{C^2}$$

where $C_u$ is the sonic velocity in a completely unoriented structure and C is the sonic velocity in the oriented test sample.

The oriented crystalline fibers of this invention are characterized by a sonic velocity of at least 1.85 kilometers per second ($\alpha=0.26$). Fibers having a sonic velocity less than about 1.85 kilometers per second are not sufficiently oriented for adequate tensile properties.

In the process for preparing the oriented crystalline fibers of this invention, it is necessary that, prior to the crystallization step, the fibers be drawn to the extent that the sonic velocity in the direction of orientation is at least 2.0 kilometers per second ($\alpha=0.36$). Structures which are oriented to a lesser extent do not retain sufficient orientation during the solvent crystallization step. Practically, this means that draw ratios of at least 4.0 must be used at a temperature of 170–180° C.

Unoriented non-crystalline fibers from which the fibers of this invention are prepared may be obtained by procedures known in the art. For example, undrawn non-crystalline fibers may be prepared by "dry spinning" a solution of the polycarbonate of 2,2-(4,4'-dihydroxydiphenyl)propane dissolved in methylene chloride. The chief requirement of the method of producing the undrawn (as-spun) fiber is that the polymer in the fiber have an intrinsic viscosity of at least about 0.80. Thus, procedures which result in a high degree of polymer degradation during spinning are less desirable in the formation of these fibers.

The orientation of the as-spun filaments may be accomplished by drawing the filaments at a temperature between 170° C. and 180° C. by methods known in the art. For example, undrawn yarns may be drawn by passing them around a feed roll heated to a temperature between 170° C. and 180° C. and then around a draw roll operating with sufficient speed to produce a draw ratio of at least 4.0, and preferably above 5.0. In an alternative procedure the undrawn yarn is drawn in two stages: in the first stage the yarn is drawn at a temperature between 170° C. and 180° C. with a draw ratio between 4.0 and 5.0; the drawn yarn is annealed at a temperature of 175° C.; then the annealed yarn is given a second draw with a drawn ratio between 1.1 and 1.5× at a temperature between 160° C. and 180° C. The two-stage drawing process appears to give a slightly higher degree of crystallinity and orientation than the single-stage drawing process.

The heating of the yarn during drawing may be accomplished as described above by allowing the yarn to contact a heated feed roll; or, alternatively, the yarn may be heated by steam or other hot fluid.

The superior properties of the fibers of this invention are obtained by exposing the highly oriented fiber to a crystallization step in which the fiber is contacted, under sufficient tension to maintain substantially constant length, with a solvent characterized by the fact that it induces crystallization in the structure at a faster rate than it dissolves the polymer. In order to obtain the desired degree of crystallization it is necessary for the highly drawn fibers to contact the solvent for a period of at least about one second.

Exposure time for solvent induced crystallization will depend upon a number of factors such as the penetrating ability of the solvent or solvent mixture, the denier of the drawn filaments and the temperature at which crystallization is effected. Thus, effective exposure periods may vary from contact times of at least one second to periods up to a number of hours.

As stated previously the solvents which may be used in the process of this invention are limited to those which induce crystallization faster than they dissolve the polymer. Few solvents have been found which fill the requirements of the process. Solvents which are found to be operable include acetone, mixtures of acetone and water, and tetrachloroethylene. The rate of crystallization achieved by using acetone-water mixtures varies inversely with the water content, which allows a degree of flexibility in treating time by varying the composition of the acetone and water mixture.

Solvents which are not operable in the process of this invention include carbon tetrachloride, methylene chloride, benzene, methanol, ethanol, dioxane, trichloroethylene, butanone, heptane, and acetic acid.

After the oriented polycarbonate yarn has been crystallized by the proper exposure to a solvent while being held at substantially constant length, as described herein, all of the remaining shrinkage in the yarn may then be removed, if desired, by further treatment of the yarns with solvent while maintaining the yarn in a relaxed state. For example, free hanging skeins of the yarn may be suspended in acetone or in tetrachloroethylene at elevated temperatures for several minutes to further crystallize the yarn, whereupon the yarn no longer shrinks upon exposure to any of the known dry cleaning solvents. This additional solvent treatment does not destroy yarn properties in yarn which was first crystallized by treatment with solvent at constant length. On the other hand, treatment of the drawn but uncrystallized yarn in a relaxed state with a solvent such as acetone or tetrachloroethylene produces a yarn which is quite brittle and has little or no elasticity (break elongation of 2–3%). Such yarn is completely useless for textile purposes.

Surprisingly, the process of this invention produces yarns which are resistant to shrinking and coalescing by dry cleaning solvents without suffering loss of other physical properties which are important in the utilization of these yarns. For example, yarns produced according to the process of this invention may be used to prepare fabrics having "wash-wear" properties equivalent to yarns which have not been given the crystallizing treatment. Furthermore, oriented crystalline yarns of this invention exhibit an improved thermal stability; e.g., they may be heat set at 180° C. without excessive shrinkage or ironed at normal ironing temperatures for synthetic fiber fabrics (140–150° C.) without distortion or glazing. In addition it is found that the oriented crystalline yarns of this invention exhibit a substantial improvement in resistance to alkaline hydrolysis over yarns which have not been crystallized to the same extent.

The following examples are cited to illustrate and not limit the invention.

EXAMPLE I 2,2-(4,4'-dihydroxydiphenyl)propane is dissolved in pyridine and reacted with phosgene according to methods known in the art to give a polycarbonate having an intrinsic viscosity of 1.02. The polycarbonate is dissolved in methylene chloride to give a solution containing 16 percent solids and the solution is dry spun using a seventeen hole spinneret maintained at a temperature of 41° C. and a windup speed of 100 y.p.m. The seventeen filament, 220 denier, as-spun yarn is found to have an intrinsic viscosity of 0.95, an absolute crystallinity of about 3 percent, a degree of orientation associated with a sonic velocity of 1.80 km./sec. ($\alpha=0.21$), and a density of about 1.190. When a sample of the yarn is exposed to tetrachloroethylene at 65° C. for five minutes the as-spun yarn is found to shrink 47.9 percent.

The as-spun yarn prepared as described above is drawn using a heated feed roll maintained at a temperature of 175° C., a draw ratio of 5.0, and a draw speed of 85 y.p.m. The drawn yarn is found to have a denier of 44 and a tenacity of of 1.84 g.p.d. with a break elongation of 35 percent. The yarn has an absolute crystallinity of 16 percent, a density of 1.206, and a degree of orientation characterized by a sonic velocity of 2.19 km./sec. ($\alpha=0.47$). When a sample of the drawn yarn is exposed to tetrachloroethylene at 65° C. for 5 minutes it is found to shrink about 20%. Fused filaments are observed and the sample is quite brittle.

The drawn yarn prepared above is wrapped on a bobbin in such a fashion that it is not free to shrink, and the bobbin immersed in a mixture of 90 parts of acetone and 10 parts of water (by volume) for 15 seconds and then dried. The solvent treated yarn is found to have a tenacity of 2.16 g.p.d. and a break elongation of 30%. The yarn is found to have an absolute crystallinity of 36%, a density of 1.230, and a degree of orientation associated with a sonic velocity of 1.92 km./sec. ($\alpha=0.31$). When the oriented crystallized yarn is exposed to tetrachloroethylene at 65° C. for five minutes it is found to shrink only about 10%, or about half as much as the same yarn before the solvent treatment. Furthermore, no fused filaments are detected. When this example is repeated using polymer with an intrinsic viscosity of 0.70, an oriented crystalline yarn resistant to solvent shrinkage is not obtained.

EXAMPLE II

The procedure of Example I is repeated with the exception that in the crystallizing step the acetone-water mixture is replaced by 100% acetone and the yarn is exposed to the acetone for only one second. The resulting crystalline oriented yarn is found to have a tenacity of 1.75 g.p.d., a break elongation of 18%, an absolute crystallinity of 40%, a density of 1.238, and a degree of orientation characterized by sonic velocity of 1.96 km./sec. ($\alpha=0.34$). When exposed to tetrachloroethylene at 65° C. for five minutes the yarn is found to shrink about 12.5%.

EXAMPLE III

The process of Example I is repeated with the exception that the solvent used in the crystallization step is 100 percent tetrachloroethylene, and the solvent treatment is carried out for a period of one second at 72° C. The oriented crystalline yarn produced is found to have a tenacity of 1.47 g.p.d., a break elongation of 37.8 percent, an absolute crystallinity of 44 percent, a density of 1.236, and a degree of orientation characterized by a sonic velocity of 1.98 km./sec. ($\alpha=0.31$). The oriented crystalline yarn is exposed in a relaxed condition to tetrachloroethylene at 65° C. for five minutes and found to shrink about 10.6 percent. No coalescing of filaments is observed.

Substantially equivalent results are obtained when the yarn is crystallized by exposure to vapors of tetrachloroethylene at 90° C., instead of immersing the yarn in the liquid solvent.

EXAMPLE IV

As-spun yarn prepared as in Example I is drawn in steam at a temperature of 175° C. using a draw ratio of 6.824 and a draw speed of 149 y.p.m. The drawn yarn is found to have a tenacity of 1.94 g.p.d., a break elongation of 26 percent, an absolute crystallinity of 10 percent, a density of 1.203, and a degree of orientation characterized by a sonic velocity of 2.12 km./sec.

($\alpha$=0.43). The drawn yarn is wrapped on a bobbin and exposed, at constant length, to a mixture of 60 parts acetone and 40 parts water (by volume) for a period of 300 seconds. The oriented crystalline yarn used is found to have a tenacity of 3.12 g.p.d., a break elongation of 36 percent, an absolute crystallinity of 35 percent, a density of 1.227, and a degree of orientation characterized by a sonic velocity of 1.92 km./sec. ($\alpha$=0.31). When a sample of the oriented crystalline yarn is exposed in a relaxed condition to tetrachloroethylene at 65° C. for five minutes it is found to shrink about 9 percent, whereas a control yarn which was drawn but not crystallized by exposure to the solvent is found to shrink approximately 21 percent, or more than twice as much as the test sample.

EXAMPLE V

The oriented crystalline yarn prepared in Example I is exposed in a free-to-shrink condition to tetrachloroethylene at 65° C. for a period of five minutes. The resulting yarn is found to have a tenacity of 1.71 g.p.d., a break elongation of 54%, an absolute crystallinity of 43 percent, a density of 1.236, and a degree of orientation characterized by a sonic velocity of 1.89 km./sec. ($\alpha$=0.29). This highly crystallized polycarbonate yarn is found to exhibit no additional shrinkage when further exposed in a relaxed condition for extended periods of time to either tetrachloroethylene or to acetone. The yarn does not become brittle, and no fused filaments are observed.

EXAMPLE VI

The oriented crystalline yarn of Example I is woven into a plain weave taffeta fabric. Samples of the fabric are subjected to standard dry cleaning procedures utilizing "Perclene" (trademark of E. I. du Pont de Nemours and Co.) tetrachloroethylene as the solvent. The samples show no sign of coalescence of filaments and shrinkage is only about 11 percent, whereas fabric samples woven from yarn which was spun and drawn in a similar fashion but not crystallized by exposure to solvents, were found to become stiff and boardy, (indicating coalesence of filaments) and to shrink approximately 39 percent.

EXAMPLE VII

A sample of crystalline oriented polycarbonate yarn prepared as in Example I is immersed for two hours in a boiling solution of 0.25 normal sodium hydroxide, rinsed, dried, and weighed. The sample is found to have suffered a weight loss of about 6 percent. This low weight loss upon alkaline hydrolysis is in direct contrast to the high weight loss of 17 percent suffered by similar sample which was oriented but not crystallized according to the process of this invention.

EXAMPLE VIII

The oriented crystalline yarn of Example I is two-plied to give a yarn of thirty-four filaments and seventy denier. A fabric is woven having a 126 x 80 plain weave construction with seven turns twist in the warp and two turns twist in the filling in finished form. The fabric is boiled off and heat set at a temperature of 140° C.

A one-square-yard fabric sample is washed in an automatic washing machine followed by tumble-drying. After five successive washing and drying cycles the appearance is rated 3.5 on a scale where 1.0 represents severe wrinkling and 5.0 no wrinkling. For a comparison, comparable fabrics from cotton are rated 1.0, fabrics from a resin treated commercial "wash-wear" cotton 2.3, from a 65/35 blend of "Dacron" (trademark for Du Pont polyester fiber) polyester fiber cotton 2.4, and from 100% "Dacron" (trademark for Du Pont polyester fiber) polyester fiber 2.6.

This example demonstrates that the superior "wash-wear" performance of the fibers of this invention have not been damaged by the crystallization process used to reduce the solvent sensitivity of the fiber.

EXAMPLE IX

Drawn polycarbonate yarns prepared in a manner similar to that described in Examples I and IV are crystallized by immersion at 25° C. in acetone-water mixtures of various percentage compositions. The treated yarns are then tested for solvent sensitivity by immersing them for five minutes in tetrachloroethylene at 65° C. The results of the test, summarized in the following table illustrate the flexibility in treating time obtainable by varying the acetone-water ratio.

Table I

| Sample No. | Crystallizing Conditions | | | | Yarn Crystallinity, Percent | Solvent Shrinkage [1], Percent |
| --- | --- | --- | --- | --- | --- | --- |
| | [$\eta$] | Draw Ratio | Acetone/Water | Treating Time | | |
| Test 1 | 1.02 | 6.824 | 70/30 | 30 sec. | 27 | 9.3 |
| Test 2 | 1.02 | 6.824 | 60/40 | 45 sec. | 27 | 10.2 |
| Test 3 | 1.02 | 6.824 | 55/45 | 60 sec. | 27 | 10.8 |
| Test 4 | 0.90 | 4.5X | 80/20 | 120 sec. | 30 | 12.9 |
| Test 5 | 0.90 | 6.00X | 90/10 | 15 sec. | 37 | 10.0 |
| Control 1 | 1.02 | 6.048 | None | | <5 | 21.8 |
| Control 2 | 1.02 | 6.824 | None | | <7 | 15.4 |
| Control 3 | 0.90 | As-spun | None | | 0 | 47.9 |
| Control 4 | 0.90 | 2.55 | None | | <5 | 59.4 |
| Control 5 | 0.90 | 2.55 | 55/45 | 5 min. | 25 | 30.6 |
| Control 6 | 0.90 | 4.5X | None | | 0 | 32.8 |
| Control 6a | 0.90 | 4.5X | 80/20 | 15 sec. | 25 | 19.3 |
| Control 7 | 0.90 | 6.00X | None | | <5 | 20.4 |

[$\eta$]=intrinsic viscosity of polymer.
[1] Shrinkage in tetrachloroethylene, 65° C., 5 minutes.

Although this invention has been particularly described with respect to the homopolymer consisting of the polycarbonate of 2,2-(4,4'-dihydroxydiphenyl)propane, it is equally applicable to copolymers containing minor amounts of residues of other acids and glycols in the polymer chain. For example, the polymer may contain minor amounts of other dicarboxylic acids such as terephthalic, isophthalic, 4,4'-bibenzoic, and 4,4'-dicarboxydiphenylmethane. Alternatively, the glycol portion of the recurring structural units may be prepared partly from other glycols and dihydroxyphenols such as ethylene glycol, 1,1-(4,4'-dihydroxydiphenyl)cyclohexane, 2,2-(3,3',5,5'-tetrachloro-4,4'-dihydroxydiphenyl)propane and 2,2-(3,3'-dimethyl-4,4'-dihydroxydiphenyl)propane.

An important class of copolymers to which this invention is applicable is comprised of those copolycarbonates of 2,2-(4,4'-dihydroxydiphenyl)propane containing dye sites to confer dyeability with basic and acid dyes. For example, copolycarbonates dyeable with basic dyes may be prepared by including in the polymer molecule sulfonate salt groups as described in French Patent 1,149,261. Such copolycarbonates may be prepared by adding to the polymerization reaction mixture minor amounts of a monomer such as the diglycol ester of sodium-3,5-dicarboxy benzene sulfonate. Dye sites for acid dyes may be obtained by including tertiary amine groups in the polymer molecule. For example, tertiary amine groups may be inserted by including in the polymerization reaction mixture minor amounts of monomers such as 1,4-piperazine diethanol or 2,5-pyridine diethanol.

The fibers, filaments and fabrics of this invention are not only useful in wearing apparel where the fabric may come in contact with dry cleaning solvents such as the chlorinated hydrocarbons, but are also useful in various industrial applications where contact with solvents is occasionally or constantly encountered. Examples of such industrial applications are filter cloths, laundry bags, and surgical dressings.

While the foregoing descriptions have been made with respect to certain specific embodiments of the present invention, it is to be understood that changes and modifications may be made without departing from the spirit and scope of the invention as defined in the appended claims.

We claim:

1. The process of preparing filamentary structures which comprises spinning filaments from the polycarbonate of 2,2-(4,4'-dihydroxydiphenyl)propane, having an intrinsic viscosity of at least 0.80; drawing the as-spun filament at a temperature between 170° C. and 180° C. with a draw ratio of at least 4.0, and thereafter bringing the oriented filamentary structure under tension into contact for a period of at least 1 second with a solvent characterized by the property of inducing crystallization in the oriented filament at a rate faster than it dissolves the polymer.

2. The process of claim 1 in which the intrinsic viscosity is at least 0.90.

3. The process of claim 1 in which the degree of molecular orientation of the drawn crystalline structure corresponds to a sonic velocity greater than 1.85 km./sec.

4. The process of claim 3 in which the degree of molecular orientation of the drawn uncrystallized structure corresponds to a sonic velocity greater than 2 km./sec.

5. The process of claim 1 in which the yarn is drawn 4X to 5X; annealed at about 175° C. and then again drawn from 1.1X to 1.5X at a temperature between 160° C. and 180° C.

6. The process of claim 1 in which the solvent is acetone.

7. The process of claim 1 in which the solvent is a mixture of acetone and water.

8. The process of claim 1 in which the solvent is tetrachloroethylene.

References Cited by the Examiner

UNITED STATES PATENTS

| | | | |
|---|---|---|---|
| 2,612,679 | 10/52 | Ladisch | 28—82 |
| 2,674,025 | 4/54 | Ladisch | 28—82 |
| 2,935,371 | 5/60 | Magat | 18—54 |
| 2,935,372 | 5/60 | Steuber | 18—54 |
| 2,956,308 | 10/60 | Schulken et al. | 18—47.5 |

FOREIGN PATENTS

| | | |
|---|---|---|
| 564,009 | 2/58 | Belgium. |

OTHER REFERENCES

Schnell, Angewandte Chemie, vol. 68, pages 633–40 (pages 636–7), 1956.

Schnell, Industrial Eng. Chem., vol. 51, No. 2, pages 157–60, Feb. 1959.

WILLIAM H. SHORT, *Primary Examiner.*

WILLIAM J. STEPHENSON, HAROLD N. BURSTEIN, *Examiners.*